United States Patent
Han et al.

(10) Patent No.: US 10,351,178 B2
(45) Date of Patent: Jul. 16, 2019

(54) DASH PANEL SUPPORTING STRUCTURE FOR VEHICLE

(71) Applicants: HYUNDAI MOTOR COMPANY, Seoul (KR); KIA MOTORS CORPORATION, Seoul (KR)

(72) Inventors: Wook Hyun Han, Seoul (KR); Seung Hyun Kang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/796,637

(22) Filed: Oct. 27, 2017

(65) Prior Publication Data
US 2019/0016394 A1 Jan. 17, 2019

(30) Foreign Application Priority Data
Jul. 12, 2017 (KR) .......................... 10-2017-0088472

(51) Int. Cl.
| B62D 25/08 | (2006.01) |
| B62D 25/14 | (2006.01) |
| B62D 25/20 | (2006.01) |
| B62D 27/02 | (2006.01) |

(52) U.S. Cl.
CPC ........... B62D 25/14 (2013.01); B62D 25/081 (2013.01); B62D 25/145 (2013.01); B62D 25/2018 (2013.01); B62D 25/2045 (2013.01); B62D 27/02 (2013.01)

(58) Field of Classification Search
CPC ...... B62D 25/14; B62D 25/145; B62D 25/08; B62D 25/081; B62D 25/2045; B62D 25/147; B62D 27/02; B62D 25/2018
USPC ........................................ 296/70, 72, 193.02
See application file for complete search history.

(56) References Cited

U.S. PATENT DOCUMENTS

| 6,260,914 | B1 | 7/2001 | Nieminski et al. | |
| 6,688,676 | B1 | 2/2004 | Sato | |
| 2002/0050726 | A1 | 5/2002 | Okana et al. | |
| 2008/0122260 | A1* | 5/2008 | Meier | B62D 25/145 296/190.08 |
| 2008/0122264 | A1* | 5/2008 | Wrobel | B62D 21/157 296/203.02 |
| 2015/0008703 | A1* | 1/2015 | Furusaki | B62D 21/152 296/187.08 |

(Continued)

FOREIGN PATENT DOCUMENTS

| CN | 102248967 A | 11/2011 |
| JP | 2561374 B2 | 12/1996 |

(Continued)

*Primary Examiner* — Gregory A Blankenship
(74) *Attorney, Agent, or Firm* — Morgan, Lewis & Bockius LLP

(57) ABSTRACT

A dash panel supporting structure includes a center member rested on a tunnel portion of a vehicle, a bridge member connected to an upper portion of the center member, and a pair of side members configured to support both ends of the bridge member and both ends of the center member on inner portions of side pillars of the vehicle. Therefore, the tunnel portion, a cowl panel and A-pillars of the vehicle are supported by each other through the dash panel supporting structure, so that the torsional rigidity of the vehicle is improved.

19 Claims, 4 Drawing Sheets

(56) References Cited

U.S. PATENT DOCUMENTS

| | | | | |
|---|---|---|---|---|
| 2015/0145237 A1* | 5/2015 | Morita | ................. | B62D 25/145 |
| | | | | 280/779 |
| 2015/0145283 A1* | 5/2015 | Nishino | ............. | B62D 25/2045 |
| | | | | 296/187.1 |
| 2015/0145284 A1* | 5/2015 | Nishida | .............. | B62D 25/2036 |
| | | | | 296/187.1 |
| 2016/0052561 A1* | 2/2016 | Atsumi | .............. | B62D 25/2045 |
| | | | | 296/187.08 |
| 2016/0272253 A1* | 9/2016 | Yoshida | ................. | B62D 25/14 |

FOREIGN PATENT DOCUMENTS

| | | |
|---|---|---|
| JP | H09-109923 A | 4/1997 |
| JP | 2002-145124 A | 5/2002 |
| JP | 2005-199945 A | 7/2005 |
| JP | 2006-193086 A | 7/2006 |
| JP | 2010-105534 A | 5/2010 |
| KR | 10-2005-0055369 A | 6/2005 |
| KR | 10-2010-0060286 A | 6/2010 |
| KR | 10-2011-0058181 A | 6/2011 |
| KR | 10-1499447 B1 | 3/2015 |

\* cited by examiner

# DASH PANEL SUPPORTING STRUCTURE FOR VEHICLE

CROSS-REFERENCE TO RELATED APPLICATION

This application claims the benefit of Korean Patent Application No. 10-2017-0088472, filed on Jul. 12, 2017 in the Korean Intellectual Property Office, the disclosure of which is incorporated herein by reference.

BACKGROUND

Field

Embodiments of the present disclosure relate to a dash panel supporting structure for vehicle for supporting a dash panel that partitions an engine room of a vehicle from an interior room of the vehicle.

Description of the Related Art

A vehicle includes an engine room to accommodate an engine, and an interior room where a driver is located, and a dash panel is disposed between the engine room and the interior room to partition the engine room from the interior room.

The dash panel also functions to absorb vibrations generated during driving and to distribute torsional load applied to the vehicle, particularly, when the vehicle turns sharply, thereby suppressing the torsion of the vehicle body, in addition to the function of partitioning the engine room from the interior room. Also, the dash panel absorbs an impact generated upon occurrence of a crash accident to prevent components in the engine room from entering the interior room.

SUMMARY

Therefore, it is an aspect of the present disclosure to provide a dash panel supporting structure for vehicle capable of improving the torsion rigidity of a vehicle body by supporting the dash panel.

Additional aspects of the disclosure will be set forth in part in the description which follows and, in part, will be obvious from the description, or may be learned by practice of the disclosure.

In accordance with one aspect of the present disclosure, a dash panel supporting structure for vehicle including a center member rested on a tunnel portion of a vehicle, a bridge member connected to an upper portion of the center member, and a pair of side members configured to support both ends of the bridge member and both ends of the center member on inner portions of side pillars of the vehicle.

The center member, the bridge member, and the pair of side members may be connected to each other by welding.

The center member, the bridge member, and the pair of side members may be integrated into one body.

The center member, the bridge member, and the pair of side members may be integrated into a frame of the vehicle.

The center member, the bridge member, and the pair of side members may be integrated through a 3 Dimensional (3D) printer.

The center member may include a curved portion curved such that both side ends of the center member are lower than a center portion of the center member, and a pair of extension portions extending horizontally from both side ends of the curved portion and connected to the pair of side members. The curved portion may be curved to correspond to the tunnel portion. The curved portion may accommodate the tunnel portion.

An upper end of the bridge member may be connected to a cowl panel of the vehicle.

The bridge member may include a center portion extending obliquely upward at both sides to have a V-shaped form, and a pair of side portions extending from both upper ends of the center portion to be inclined downward.

The bridge member may be formed by connecting four bar-shaped members to each other in a zigzag form. The bridge member may have a M-shaped form.

The pair of side members may have a horizontally laid U-shaped form, so that side ends of the bridge member are respectively connected to center, upper portions of the side members, and the center member is connected to center, lower portions of the side members.

The side members may include an upper portion extending obliquely upward, and a lower portion extending obliquely downward.

The dash panel supporting structure may further include a pair of lower members extending vertically and having upper ends connected to ones of both ends of the center member and the pair of side members.

The upper ends of the pair of lower members may be connected to the center member.

The upper ends of the pair of lower members may be connected to the center, lower portions of the side members.

The dash panel supporting structure may further include a pair of lower members connected to the center member.

The pair of lower members may be curved, and extend upward.

The lower ends of the lower members may be connected to sliding prevention bars of the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
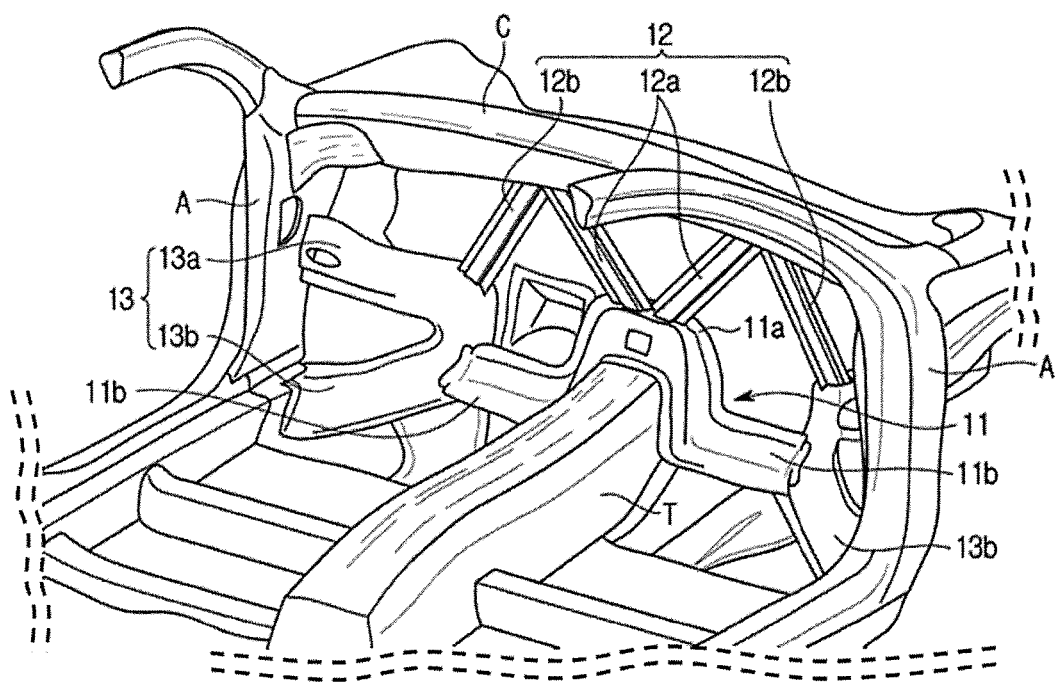
FIG. 1 shows a perspective view illustrating a dash panel supporting structure according to a first embodiment of the present disclosure.

Reference will now be made in detail to the embodiments of the present invention, examples of which are illustrated in the accompanying drawings, wherein like reference numerals refer to like elements throughout. The present specification does not describe all factors of the embodiments, and general concepts in the technical art to which the present disclosure belongs or overlapping content between the embodiments will be not described.

Also, the term "portion", "module", and the like mentioned in this specification may be implemented as hardware or software. According to embodiments, a plurality of "portions" or "modules" may be implemented as a single component, or a single "portion" or "module" may include a plurality of components.

It will be understood that when the terms "includes," "comprises," "including," and/or "comprising," when used in this specification, specify the presence of stated elements and/or components, but do not preclude the presence or addition of one or more elements and/or components thereof. Also, it is to be understood that the singular forms "a," "an," and "the" include plural referents unless the context clearly dictates otherwise Hereinafter, an embodiment of the present disclosure will be described with reference to the accompanying drawings.

Figure 2:
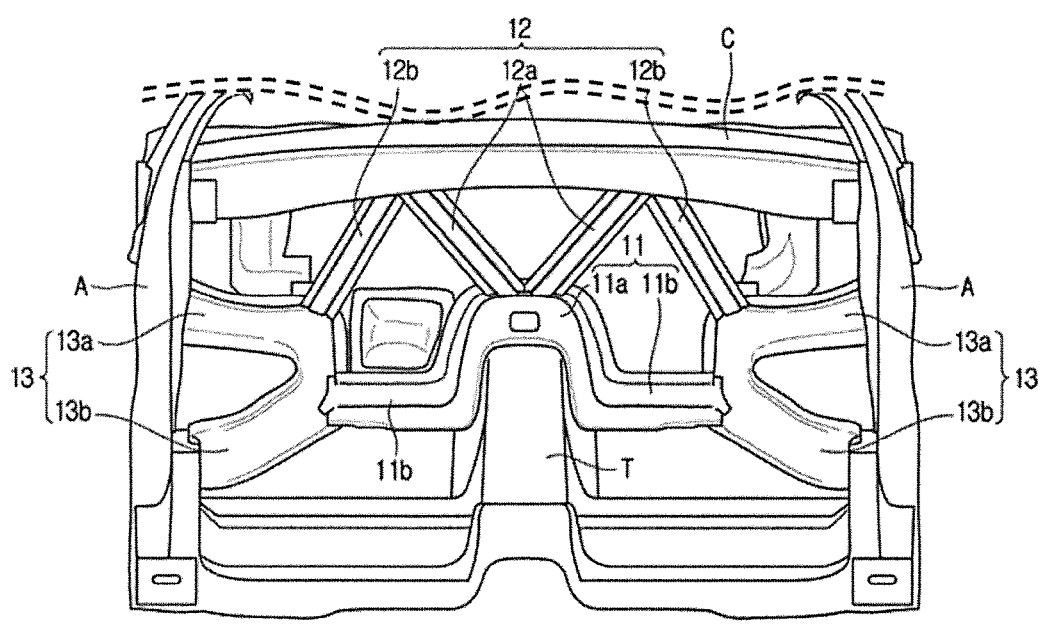
FIG. 2 shows a front view of the dash panel supporting structure according to a first embodiment of the present disclosure.

FIG. 1 is a perspective view of a dash panel supporting structure according to an embodiment of the present disclosure, and FIG. 2 is a front view of a dash panel supporting structure according to an embodiment of the present disclosure.

As shown in FIGS. 1 and 2, a dash panel supporting structure for vehicle according to a first embodiment of the present disclosure may support a dash panel (not shown) that partitions an engine room of a vehicle from an interior room of the vehicle.

The dash panel supporting structure may be disposed in a front direction from the dash panel (that is, behind the dash panel as seen from a driver) to support the dash panel, while distributing torsional load applied on a vehicle body.

The dash panel supporting structure may include a center member 11 rested and supported on a tunnel portion T of the vehicle, a bridge member 12 connected to a upper portion of the center member 11, and a pair of side members 13 connected to both ends of the center member 11 and the bridge member 12.

The center member 11 may include a curved portion 11a curved to correspond to the tunnel portion T of the vehicle and rested on a upper portion of the tunnel portion T of the vehicle, and a pair of extension portions 11b extending horizontally from both side ends of the curved portion 11a and connected to the pair of side members 13. The center portion of the curved portion 11a may be higher than the both side ends such that the tunnel portion T can be accommodated below the curved portion 11a.

The bridge member 12 may have a nearly M-shaped form, wherein the center portion is connected to the center member 11, and the both side ends are respectively connected to the side members 13. The bridge member 12 may have a M-shaped form by connecting four bar-shaped members to each other in a zigzag form.

The bridge member 12 may include a center portion 12a extending obliquely upward at both sides to have a V-shaped form, and a pair of side portions 12b extending from both upper ends of the center portion 12a to be inclined downward.

The lower end of the center portion 12a may be connected to the curved portion 11a of the center member 11, and the upper ends of the center portion 12a may be connected to a cowl panel C of the vehicle, so that the cowl panel C and the tunnel portion T can be supported with respect to each other through the center member 11 and the bridge member 12.

The side portions 12b may be connected to the cowl panel C at the upper ends, and connected to the side members 13 at the lower ends. Accordingly, the cowl panel C and A-pillars A may be supported with respect to each other through the side portions 12b and the side members 13.

The side members 13 may have a horizontally laid U-shaped form, so that the lower ends of the side portions 12b may be respectively connected to the center, upper portions of the side members 13, and the ends of the extending portions of the center member 11 may be respectively connected to the center, lower portions of the side members 13. The side members 13 may include an upper portion 13a extending obliquely upward, and a lower portion 13b extending obliquely downward.

Accordingly, the tunnel portion T, the cowl panel C, and the A-pillars A of the vehicle may be supported with respect to each other by the dash panel supporting structure configured as described above.

Therefore, the torsion rigidity of the vehicle can be improved by the dash panel supporting structure, and accordingly, the torsion of the vehicle can be suppressed even when torsional load is applied to the vehicle.

In the current embodiment, the center member 11, the bridge members 12, and the side members 13 forming the dash panel supporting structure may be connected to each other by welding. However, the center member 11, the bridge members 12, and the side members 13 may be connected to each other through any one of various fixing methods.

Also, in the current embodiment, the center member 11, the bridge members 12, and the side members 13 may be fabricated separately, and then connected to each other by welding, etc., although not limited to this. According to another example, the center member 11, the bridge members 12, and the side members 13 may be formed as one body, and then fixed on a frame of the vehicle. Also, the dash panel supporting structure may be integrated into the frame of the vehicle through a 3 Dimensional (3D) printer, etc.

Figure 3:
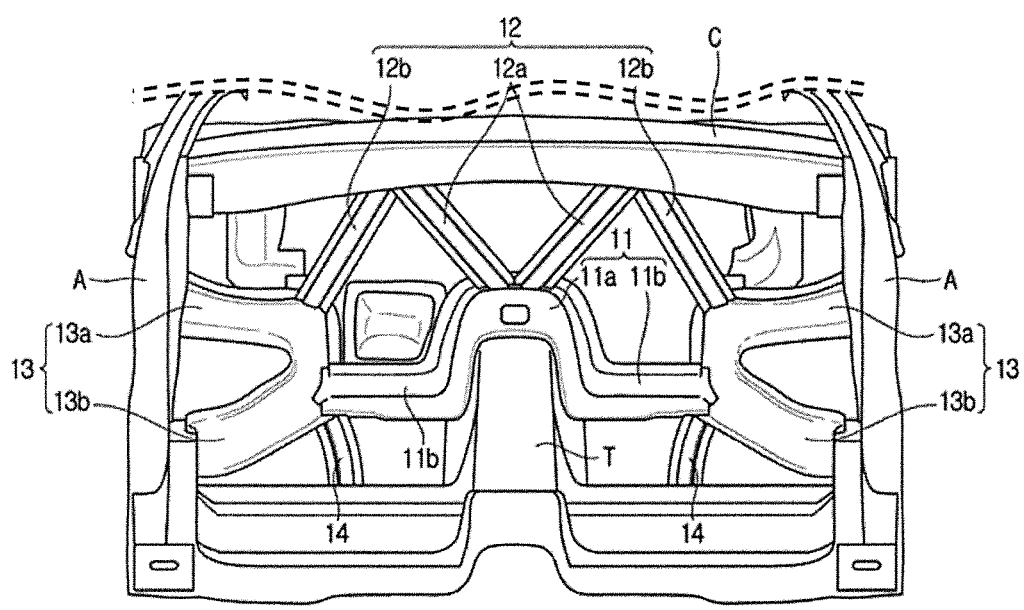
FIG. 3 shows a front view of a dash panel supporting structure according to a second embodiment of the present disclosure.

FIG. 3 shows a dash panel supporting structure according to a second embodiment of the present disclosure.

The dash panel supporting structure according to the second embodiment of the present disclosure may include a center member 11, a bridge member 12, and a pair of side members 13 having the same shapes as in the first embodiment, and further include a pair of lower members 14 extending vertically and having upper ends respectively connected to the side members 13.

The lower members 14 may be curved bars extending upward to distribute load. The upper ends of the lower members 14 may be respectively connected to the center, lower portions of the side members 13.

Although not shown in the drawings, the vehicle may include a pair of sliding prevention bars for preventing the engine room from sliding when a collision occurs. The lower ends of the lower members 14 may be connected to the sliding prevention bars through welding, etc.

Figure 4:
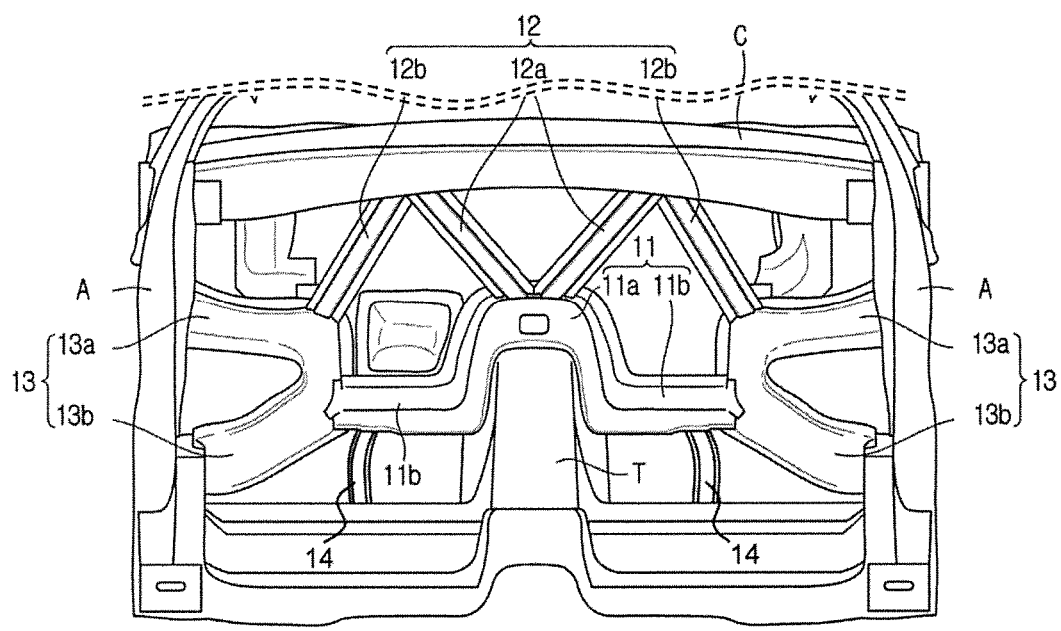
FIG. 4 shows a front view of a dash panel supporting structure according to a third embodiment of the present disclosure

In the current embodiment, the upper ends of the lower members 14 may be connected to the side members 13. However, the upper ends of the lower members 14 may be connected to the center member 11 according to another embodiment (FIG. 4).

The lower members 14 may also be integrated into the center member 11, the bridge member 12, and the pair of side members 13, or into the frame of the vehicle.

As described above, since the dash panel is supported by the dash panel supporting structure including the center member, the bridge member, and the pair of side members, the vehicle according to an aspect of the present disclosure can improve torsion rigidity.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A dash panel supporting structure for a vehicle comprising:
   a center member rested on a tunnel portion of the vehicle;
   a bridge member connected to an upper portion of the center member; and
   a pair of side members configured to support both ends of the bridge member and both ends of the center member on inner portions of side pillars of the vehicle,
   wherein the pair of side members have a horizontally laid U-shaped form, so that side ends of the bridge member are respectively connected to center, upper portions of the side members, and the center member is connected to center, lower portions of the side members.

2. The dash panel supporting structure according to claim 1, wherein the center member, the bridge member, and the pair of side members are connected to each other by welding.

3. The dash panel supporting structure according to claim 1, wherein the center member, the bridge member, and the pair of side members are integrated into one body.

4. The dash panel supporting structure according to claim 1, wherein the center member, the bridge member, and the pair of side members are integrated into a frame of the vehicle.

5. The dash panel supporting structure according to claim 1, wherein the center member includes a curved portion curved such that both side ends of the center member are lower than a center portion of the center member, and a pair of extension portions extending horizontally from both side ends of the curved portion and connected to the pair of side members.

6. The dash panel supporting structure according to claim 1, wherein an upper end of the bridge member is connected to a cowl panel of the vehicle.

7. The dash panel supporting structure according to claim 1, wherein the bridge member includes a center portion extending obliquely upward at both sides to have a V-shaped form, and a pair of side portions extending from both upper ends of the center portion to be inclined downward.

8. The dash panel supporting structure according to claim 7, wherein the bridge member is formed by connecting four bar-shaped members to each other in a zigzag form.

9. The dash panel supporting structure according to claim 1, wherein the side members include an upper portion extending obliquely upward, and a lower portion extending obliquely downward.

10. The dash panel supporting structure according to claim 9, further comprising a pair of lower members extending vertically and having upper ends connected to one of the both ends of the center member and the pair of side members.

11. The dash panel supporting structure according to claim 10, wherein the pair of lower members are curved, and extend upward.

12. The dash panel supporting structure according to claim 10, wherein the lower ends of the lower members are connected to sliding prevention bars of the vehicle.

13. The dash panel supporting structure according to claim 5, wherein the curved portion is curved to correspond to the tunnel portion.

14. The dash panel supporting structure according to claim 13, wherein the curved portion accommodates the tunnel portion.

15. The dash panel supporting structure according to claim 8, wherein the bridge member has a M-shaped form.

16. The dash panel supporting structure according to claim 9, further comprising a pair of lower members connected to the center member.

17. The dash panel supporting structure according to claim 10, wherein the upper ends are connected to the center, lower portions of the side members.

18. The dash panel supporting structure according to claim 1, wherein the center member, the bridge member, and the pair of side members are integrated through a 3 Dimensional (3D) printer.

19. The dash panel supporting structure according to claim 10, wherein the upper ends of the pair of lower members are connected to the center member.

* * * * *